(12) United States Patent
Kale et al.

(10) Patent No.: US 11,915,122 B2
(45) Date of Patent: Feb. 27, 2024

(54) GATEWAY FOR DISTRIBUTING AN ARTIFICIAL NEURAL NETWORK AMONG MULTIPLE PROCESSING NODES

(71) Applicant: Micron Technology, Inc., Boise, ID (US)

(72) Inventors: Poorna Kale, Folsom, CA (US); Amit Gattani, Granite Bay, CA (US)

(73) Assignee: Micron Technology, Inc., Boise, ID (US)

( * ) Notice: Subject to any disclaimer, the term of this patent is extended or adjusted under 35 U.S.C. 154(b) by 552 days.

(21) Appl. No.: 16/942,341

(22) Filed: Jul. 29, 2020

(65) Prior Publication Data

US 2022/0036157 A1 Feb. 3, 2022

(51) Int. Cl.
*G06N 3/063* (2023.01)
*G06N 3/045* (2023.01)

(52) U.S. Cl.
CPC ............ *G06N 3/045* (2023.01); *G06N 3/063* (2013.01)

(58) Field of Classification Search
CPC .............................. G06N 3/0454; G06N 3/063
See application file for complete search history.

(56) References Cited

U.S. PATENT DOCUMENTS

| | | | |
|---|---|---|---|
| 6,047,277 A * | 4/2000 | Parry | G06F 40/279 706/14 |
| 10,713,754 B1 | 7/2020 | Wang et al. | |
| 11,588,735 B2 | 2/2023 | Bielby | |
| 2017/0083829 A1 | 3/2017 | Kang et al. | |
| 2018/0174023 A1 | 6/2018 | Imam et al. | |
| 2018/0300964 A1 * | 10/2018 | Lakshamanan | G06F 9/5027 |
| 2018/0322711 A1 | 11/2018 | Weimerskirch | |
| 2018/0373988 A1 | 12/2018 | Dhanyamraju et al. | |
| 2019/0042884 A1 | 2/2019 | Guim Bernat et al. | |
| 2019/0073586 A1 | 3/2019 | Chen et al. | |
| 2019/0114537 A1 * | 4/2019 | Wesolowski | G06N 3/084 |
| 2019/0164033 A1 | 5/2019 | Khapali et al. | |

(Continued)

FOREIGN PATENT DOCUMENTS

| | | |
|---|---|---|
| WO | 2016096226 | 6/2016 |
| WO | 2022100861 | 5/2022 |

OTHER PUBLICATIONS

Moreno-Álvarez et al., "Training deep neural networks: a static load balancing approach", Springer Science+Business Media, LLC, part of Springer Nature 2020, Mar. 2, 2020 (Year: 2020).*

(Continued)

*Primary Examiner* — Casey R. Garner
(74) *Attorney, Agent, or Firm* — Greenberg Traurig

(57) ABSTRACT

Methods, systems, and apparatus related to dynamic distribution of an artificial neural network among multiple processing nodes based on real-time monitoring of a processing load on each node. In one approach, a server acts as an intelligent artificial intelligence (AI) gateway. The server receives data regarding a respective operating status for each of monitored processing devices. The monitored processing devices perform processing for an artificial neural network (ANN). The monitored processing devices each perform processing for a portion of the neurons in the ANN. The portions are distributed in response to monitoring the processing load on each processing device (e.g., to better utilize processing power across all of the processing devices).

18 Claims, 6 Drawing Sheets

(56) References Cited

U.S. PATENT DOCUMENTS

| | | |
|---|---|---|
| 2019/0205744 A1 | 7/2019 | Mondello et al. |
| 2019/0248411 A1* | 8/2019 | Peng et al. |
| 2019/0295003 A1* | 9/2019 | Dronen ................ G05D 1/0221 |
| 2019/0382004 A1 | 12/2019 | Golov |
| 2019/0382029 A1 | 12/2019 | Golov |
| 2020/0050209 A1 | 2/2020 | Bai et al. |
| 2020/0176121 A1 | 6/2020 | Dalal et al. |
| 2022/0038375 A1 | 2/2022 | Bielby |
| 2022/0119002 A1 | 4/2022 | Ladd |
| 2022/0161815 A1* | 5/2022 | Van Beek ........... B60W 30/182 |
| 2023/0198905 A1 | 6/2023 | Bielby |

OTHER PUBLICATIONS

En Li et al., "Edge Intelligence: On-Demand Deep Learning Model Co-Inference with Device-Edge Synergy."The SIGCOMM Workshop on Mobile Edge Communications, Aug. 21-23, 2018, Retrieved from the Internet <https://arxiv.org/abs/1806.07840v4> on Oct. 23, 021.

International Search Report and Written Opinion, PCT/US2021/042672, dated Nov. 2, 2021.

Edge Processing of Sensor Data using a Neural Network to Reduce Data Traffic on a Communication Network, U.S. Appl. No. 16/942,317, filed Jul. 29, 2020, Feb. 1, 2023, Robert Bielby, Patented Case.

Edge Processing of Sensor Data using a Neural Network to Reduce Data Traffic on a Communication Network, U.S. Appl. No. 18/168,811, filed Feb. 14, 2023, Jun. 29, 2023, Robert Bielby, Non Final Action Mailed.

* cited by examiner

GATEWAY FOR DISTRIBUTING AN ARTIFICIAL NEURAL NETWORK AMONG MULTIPLE PROCESSING NODES

FIELD OF THE TECHNOLOGY

At least some embodiments disclosed herein relate to neural network processing devices in general, and more particularly, but not limited to distributing an artificial neural network among multiple processing nodes.

BACKGROUND

Recent developments in the technological area of autonomous driving allow a computing system to operate, at least under some conditions, control elements of a motor vehicle without the assistance from a human operator of the vehicle.

For example, sensors (e.g., cameras and radars) can be installed on a motor vehicle to detect the conditions of the surroundings of the vehicle traveling on a roadway. A computing system installed on the vehicle analyzes the sensor inputs to identify the conditions and generate control signals or commands for the autonomous adjustments of the direction and/or speed of the vehicle, with or without any input from a human operator of the vehicle.

In some arrangements, when a computing system recognizes a situation where the computing system may not be able to continue operating the vehicle in a safe manner, the computing system alerts the human operator of the vehicle and requests the human operator to take over the control of the vehicle and drive manually, instead of allowing the computing system to drive the vehicle autonomously.

Autonomous driving and/or an advanced driver assistance system (ADAS) can use an artificial neural network (ANN) for the identification of events and/or objects that are captured in sensor inputs. Examples of sensor inputs include images from digital cameras, lidars, radars, ultrasound sonars, etc.

In general, an artificial neural network (ANN) uses a network of neurons to process inputs to the network and to generate outputs from the network. For example, each neuron in the network receives a set of inputs. Some of the inputs to a neuron may be the outputs of certain neurons in the network; and some of the inputs to a neuron may be the inputs provided to the neural network. The input/output relations among the neurons in the network represent the neuron connectivity in the network.

For example, each neuron can have a bias, an activation function, and a set of synaptic weights for its inputs respectively. The activation function may be in the form of a step function, a linear function, a log-sigmoid function, etc. Different neurons in the network may have different activation functions. The relations between the input(s) and the output(s) of an ANN in general are defined by an ANN model that includes the data representing the connectivity of the neurons in the network, as well as the bias, activation function, and synaptic weights of each neuron.

For example, the inputs to an ANN network may be generated based on camera inputs; and the outputs from the ANN network may be the identification of an item, such as an event or an object.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
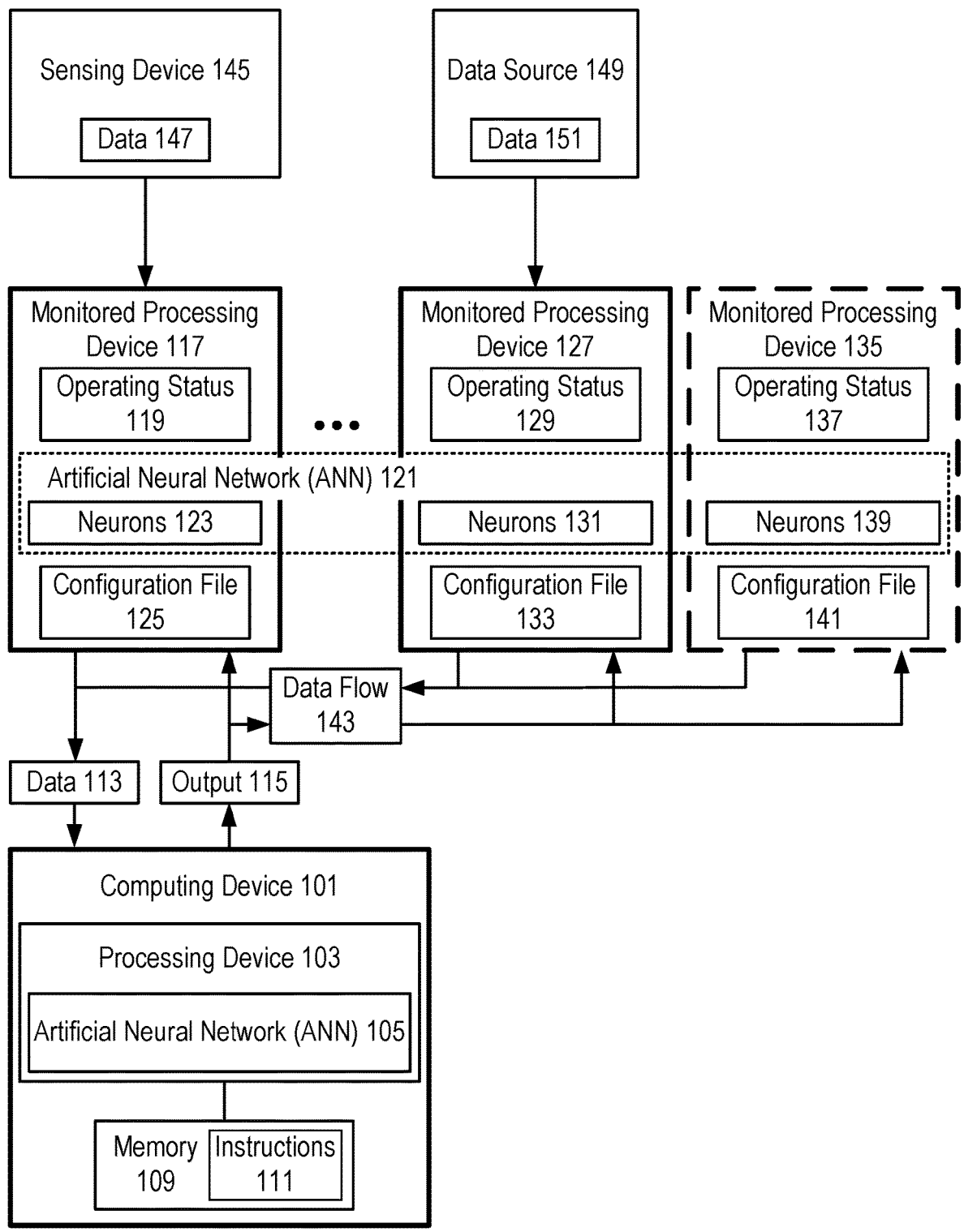
FIG. 1 illustrates a computing device that monitors processing devices configured to perform processing for neurons in an artificial neural network (ANN) and determines a new distribution for the neurons in the ANN, in accordance with some embodiments.

The following disclosure describes various embodiments for processing (e.g., processing at a vehicle and a communications server in wireless communication with the vehicle as the vehicle is traveling and/or navigating) of sensor or other data using distributed portions of one or more neural networks. In various embodiments, portions of a neural network are distributed among multiple processing nodes based on monitoring an operating status for each node (e.g., monitoring whether a processor of a node is overloaded relative to processors at other nodes). In some embodiments, sensor data is processed using a computing device (e.g., a neural network processor) located in a vehicle. The processing is performed using a portion of an artificial neural network (ANN) received from a remote computing device (e.g., a communications server) that performs further processing using other portions of the ANN. In one example, the vehicle is an autonomous vehicle (e.g., car, boat, plane, or drone).

In some existing approaches, processing resources can include, for example, a central server and edge servers. In some cases, depending on the particular data being processed and/or the data values used to define various neurons of the ANN, processing resources at the central server may be overloaded, while processing resources at an edge server are underutilized. This can create a mismatch between various processing or other resources of a network, and particular processing needs for performing computations for an artificial neural network (ANN).

Also, in some existing approaches, mobile devices (e.g., an autonomous vehicle) can store and/or generate sensor data that needs to be processed in a cloud or other server (e.g., that is remotely located from the vehicle). For example, autonomous vehicles have ANNs configured to recognize and/or classify objects captured in camera images. Such images can be uploaded to the cloud or other server for processing, training, etc. The processing in the cloud or server is often performed via multiple layers of artificial neurons.

However, sending image data for processing by the layers of the ANN at the cloud or server may require sending large data files or streams of image data (e.g., image streams from a camera of a vehicle). For example, this increases data traffic on a communication network (e.g., cellular or other wireless network) between a vehicle that collects the data and a remote cloud server. This can significantly degrade performance of the communication network by requiring significant bandwidth to transfer the image or other sensor data. This also can cause a mobile device to consume excessive battery power, which may be limited for certain smaller mobile devices.

Various embodiments described below provide systems, methods, and apparatus for distributing neurons of ANNs to processing resources. This enables more efficient system resource utilization. Distributing neurons of ANNs within a system can also result in processing data closer to the data source resulting in less data traffic. For example, after an image is processed by one or more layers, the output of the layers can be much smaller than the image itself.

In one embodiment, a server (e.g., a virtual machine in the cloud, or a communications server) controls a distribution of neurons across multiple computing devices based on monitoring a load on processing resources. In one example, the monitoring is performed in real-time (e.g., an operating status of each processing node is monitored by checking the status at least every 30 seconds or less, and in some cases at least every 50 milliseconds or less).

In one embodiment, the server acts as an intelligent artificial intelligence (AI) gateway. The server receives data regarding a respective operating status for each of various monitored processing devices (e.g., various types of separate devices communicating with each other over one or more wired and/or wireless networks). The monitored processing devices perform processing for neurons in at least one artificial neural network (ANN). In one example, the monitored processing devices include a first processing device that performs processing for first neurons of a first ANN. The first ANN is controlled primarily by software executed by the server using a virtual machine hosted in a cloud.

The server determines, based on the received data, a new distribution for the neurons in the ANN. The new distribution describes a distribution of portions of the ANN across multiple devices, including indicating that a second processing device is to perform processing for the first neurons. In response to determining the new distribution, the server sends a communication to the second processing device to transfer processing for the first neurons from the first processing device to the second processing device. In one example, the communication is an electronic message sent over a network from the server in the cloud to an edge server located nearby (e.g., within less than 500 meters) to a vehicle, or located in the vehicle.

In one embodiment, an AI gateway can be configured to dynamically flow a complex ANN among multiple processing nodes. In one example, the processing node is a computing device that performs and/or supports computations for the ANN. In one example, the processing node provides memory resources for the ANN. Examples of processing nodes may include an AI accelerator, a microprocessor, an FPGA, or a GPU. In one example, each of these processing nodes can be used for supporting computations for a set of neurons sent to the respective processing node by the AI gateway.

The AI gateway controls which particular set(s) of artificial neurons are hosted in a given selected one of the processing node. This control is based at least in part on the data flow intensity (e.g., data size of network traffic and/or extent that available communication bandwidth is used) in processing and/or communications associated with generating inference results for the ANN, and/or training the ANN. In some examples, data flow intensity can be determined based on data input rate per second, data output rate per second, percent of processing resource utilization, and/or number of calculations performed.

The AI gateway can have its own ANN (e.g., an additional, separate ANN) that evaluates the state of the ANN and predicts the best distribution of the artificial neurons among the processing nodes. In one example, the AI gateway is implemented in a virtual machine in a cloud network, and other processing nodes include other virtual machines in the cloud network. In one example, an operating status of a processing node can include number of cores, frequency, etc. In one example, the operating status may alternatively or additionally include current processor core and/or bandwidth utilization.

In one embodiment, different processing nodes can be placed at edges of the network nearby major data sources (e.g., sensors or other devices that generate data to be processed by the ANN). Additional processing nodes can be added to the network to increase processing power (e.g., adding of virtual machines in real-time based on processing demand). The AI gateway distributes the ANN across the network based on the current data status.

In some embodiments, one or more of the monitored processing devices above may be part of a memory device used to store data in a storage media (e.g., NAND flash). The stored data may be used by a host device (e.g., a computing device of an autonomous vehicle, or another computing device that accesses data stored in the memory device). In one example, the memory device is a solid-state drive mounted in an electric vehicle. In one example, the memory device uses an ANN for operation of the memory device. In one example, the memory device stores data used to train an ANN of the host device.

In one embodiment, an AI gateway distributes ANN neurons across processing nodes within a network based on the current data intensity within the network. The gateway stores a current status of each processing node within the network. The gateway receives data indicating artificial neural network (ANN) data flow intensity from one or more ANNs within the network of processing nodes.

The AI gateway applies the ANN data flow intensity data and current status of the processing nodes within the network as inputs to one or more ANN(s) within the AI gateway. Based on an output from the one or more ANN(s), the AI gateway makes one or more predictions of a more preferred or improved distribution of artificial neurons among the processing nodes within the network. Based on the one or more predictions, the gateway redistributes artificial neurons across the processing nodes in the network.

In one embodiment, a networked system (e.g., a network that provides a wireless and/or wired communication path between a vehicle and a cellular base station and/or server) includes at least one processing device (e.g. a CPU of a cloud server that acts as an AI gateway, or that is one of multiple processing nodes among which an ANN is distributed), and memory containing instructions configured to instruct the at least one processing device to perform a method including: receiving data over a network from a computing device (e.g., a controller of a memory device located in a vehicle), wherein the received data is processed using one or more artificial neural networks (ANNs) distributed across multiple devices. Each of the ANN(s) include one or more neuron models used for processing the data. The computing device of the vehicle provides the data from processing sensor data obtained from at least one sensing device of a vehicle (e.g., a camera of the vehicle). In one example, an output from the ANN(s) is used to control a system of a vehicle. In one example, a cloud server sends the output to the vehicle to cause a control action on the vehicle. In one example, the controlled system can be an engine, steering, braking, or other component of a vehicle that can be electronically controlled.

In one embodiment, an ANN includes a network of neurons stored on a computing device in memory. One layer of neurons generates outputs as inputs for the next layer of neurons. Each neuron takes one or more inputs to generate an output. In one example, one layer of neurons may be considered as one ANN and another layer of neurons as another ANN. The connected layers are one combined ANN. The computation of a layer of neurons can be formulated to include an input vector multiplying a matrix for generating an output vector. In some cases, this matrix operation can be broken down into smaller matrix operations based on a hardware acceleration capability of one or more ANN accelerators.

In one embodiment, a computing device is configured to partition the computation of an ANN having multiple layers across multiple devices (e.g., cloud, edge server, vehicle, mobile device, etc.). For example, a vehicle has sensors to generate the first input vector. The first input vector is to be multiplied by the matrix of a first layer of neurons to generate a first output vector for a second layer of neurons. Initially, all layers are in the cloud/server. If the cloud/server determines that it is advantageous for an edge server to process the first layer (e.g., instead of the cloud/server, as determined from monitoring operating status as described herein), the model of the first layer is pushed to the edge server such that the cloud/server gets the first output vector from the edge server, instead of the first input vector from the vehicle or edge server.

In one embodiment, the cloud/server monitors its ANN to determine which of one or more layers can be pushed to one or more servers or other computing devices configured on the communication paths from mobile devices to the cloud/server. In one example, the determination is made based on monitoring operating status as described herein. When the processing by the pushed layers of the ANN is sufficient, original images (e.g., from a camera of a vehicle) do not have to be uploaded to the cloud/server. Otherwise, the original images can be further uploaded from the edge servers to the cloud/server for further processing, as may be needed in certain cases.

FIG. 1 illustrates a computing device that monitors processing devices configured to perform processing for neurons in an artificial neural network (ANN) and determines a new distribution for the neurons in the ANN, in accordance with some embodiments. The computing device (e.g., computing device 101) may be, for example, a computer, embedded computer, server, laptop, tablet or other electronic device controlled by a processing device.

In one embodiment, computing device 101 contains one or more processing devices (e.g., processing device 103) and memory (e.g., memory 109). Processing device 103 may be, for example, a microprocessor, graphics processor, embedded processor, embedded controller, central processing unit (CPU), system on chip (SOC), application specific integrated circuit (ASIC), field programmable gate array (FPGA), neural network accelerator, or other processing device. Processing device 103 may be composed of a single processor with a single processing core, a single processor with multiple processing cores, or multiple processors. Processing device 103 and memory 109 may be configured on a printed circuit board. In some instances, processing device 103 and memory 109 are packaged together in an SOC.

Memory 109 can include volatile memory (e.g., DRAM and/or SRAM) and/or non-volatile memory. The memory may be separate from the processor (e.g., DIMM or SIMM modules) or may be embedded within the processor (e.g., HBM).

Examples of non-volatile memory include flash memory, memory units formed based on negative-and (NAND) logic gates, negative-or (NOR) logic gates, phase-change memory (PCM), magnetic memory (MRAM), resistive random-access memory (RRAM), cross point memory devices, etc. A cross point memory device can use transistor-less memory elements, each of which has a memory cell and a selector that are stacked together as a column. Memory element columns are connected via two lays of wires running in perpendicular directions, where wires of one lay run in one direction in the layer located above the memory element columns, and wires of the other lay are in another direction and in the layer located below the memory element columns. Each memory element can be individually selected at a cross point of one wire on each of the two layers. Cross point memory devices are fast and non-volatile and can be used as a unified memory pool for processing and storage. Further examples of non-volatile memory include read-only memory (ROM), programmable read-only memory (PROM), erasable programmable read-only memory (EPROM) and electronically erasable programmable read-only memory (EEPROM) memory, etc. Examples of volatile memory include dynamic random-access memory (DRAM) and static random-access memory (SRAM).

In one embodiment, memory 109 contains instructions 111 that instruct processing device 103 to perform actions such as, for example, receive data regarding the operating status of monitored processing devices; determine a new distribution of neurons in an artificial neural network; send communication to a processing device to transfer processing for a set of neurons within a neural network to another processing device, etc.

Processing device 103 contains an artificial neural network (ANN) 105. An ANN uses a network of neurons to process inputs to the ANN and to generate outputs from the ANN.

For example, each neuron in the ANN receives a set of inputs. Some of the inputs to a neuron may be inputs provided to the ANN, and some of the inputs to a neuron may be the outputs of certain neurons within the ANN. The input/output relations among the neurons in the ANN represent the neuron connections in the ANN.

For example, each neuron can have a bias (threshold), an activation function, and a set of neuron weights for its inputs respectively. The activation function may be in the form of a step function, a linear function, a log-sigmoid function, etc. For example, a step function may assign an output of a neuron to be 1 or 0 based on whether the calculated output of the neuron exceeds a bias value. Different neurons in the network may have different activation functions.

For example, each neuron can generate a weighted sum of its inputs and its neuron weights and then produce an output that is the function of the weighted sum, computed using the activation function of the neuron. For example, a neuron may have a quantity of inputs (e.g., i inputs) with input values (e.g., a1, a2, ai) where each input has a neuron weight value (e.g., w1, w2, . . . , wi). The neuron combines the input values with the neuron weights by calculating x=a1*w1+ a2*w2+ . . . +ai*wi. The output of the neuron is the activation function of x. In one example, if x is greater than the neuron bias value, then the output is 1, otherwise the output is 0.

A neural network accelerator in some examples includes hardware multiply-accumulate (MAC) units that accelerate the calculation of the weighted sum of two vectors (a1, a2, ai) and (w1, w2, wi) by performing computations in the form of a1*w1+a2*w2+ . . . +ai*wi. In one example, a MAC unit may take eight inputs and eight neuron weights and compute a1*w1+a2*w2+ . . . +a8*w8. If there are more than eight inputs, the calculation of a1*w1+a2*w2+ . . . +ai*wi must be broken down into vector operations of the size eight for acceleration on the MAC units. Computing device 101 can include a neural network accelerator to support computations for ANN 105.

A computing device (e.g., an AI gateway) may break down operations of a big ANN into pieces for monitored processing devices (e.g., neural network accelerators) and try to balance the workloads associated with the pieces in processing data through the ANN and try to balance the communications cost of configuring the ANN. In one example, ANN 105 in computing device 101 partitions the neurons 123, 131, 139, etc. in ANN 121 and distributes the neurons to monitored processing devices 117, 127, 135, etc. In one example, each of the monitored processing devices includes a neural network accelerator, such as above.

Partitioning an ANN can be optimized based on static characteristics of the ANN (e.g., some neuron weights are zeros), or static characteristics of the input (e.g., some inputs are zeros). For example, if the weighted sum of the inputs is predicted to be smaller than the bias value for a neuron with a step activation function, the output of the neuron would be known to be zero and the neuron could be removed from the ANN. This may result in a smaller ANN with savings in computation operations. For example, if it is known that, when a vehicle is running in a certain mode and/or with a certain condition, a section of the ANN becomes "quiet", then the prediction of the mode/condition using a smaller ANN can be used to skip computation of that section.

Partitioning neurons can be done such that the neurons operate in parallel, in layers or a combination of parallel and layers. When an ANN is partitioned into parallel neurons, each neuron processes its own data stream independent of neighboring neurons. When an ANN is partitioned into layers, processing is pipelined such that the outputs of some layers are fed as input into subsequent layers. Partitioning neurons in layers may help with load balancing in the ANN. For example, data from a sensing device may come in as a stream. With layered neurons, the streaming data can be pipelined (e.g., when a second layer is being processed for time t, a first layer can be processed for time t+delta. After time t+delta, the data from the first layer will be propagated to the second layer).

The relations between the input(s) and the output(s) of an ANN, in general, are defined by a model (ANN model) that includes the data representing the neuron connections in the ANN, as well as the bias, activation function, and neuron weights of each neuron. Using a given ANN model, a computing device computes the output(s) of the ANN from a given set of inputs to the ANN. For example, inputs to ANN 121 may be generated based on camera input from sensing device 145, and outputs from ANN 121 may be the identification of items, such as objects or events.

A spiking neural network (SNN) is a type of ANN that closely mimics natural neural networks. An SNN neuron produces a spike as output when the activation level of the neuron is sufficiently high. The activation level of an SNN neuron mimics the membrane potential of a natural neuron. The outputs/spikes of the SNN neurons can change the activation levels of other neurons that receive the outputs. The current activation level of an SNN neuron as a function of time is typically modeled using a differential equation and considered the state of the SNN neuron. Incoming spikes from other neurons can push the activation level of the neuron higher to reach a threshold for spiking. Once the neuron spikes, its activation level is reset. Before the spiking, the activation level of the SNN neuron can decay over time, as controlled by the differential equation. The element of time in the behavior of SNN neurons makes an SNN suitable for processing spatiotemporal data. The neuron connections of SNN is often sparse, which is advantageous in reducing computational workload.

In general, an ANN may be trained using a supervised method where the parameters in the ANN are adjusted to minimize or reduce the error between known outputs resulted from respective inputs and computed outputs generated from applying the inputs to the ANN. Examples of supervised learning/training methods include reinforcement learning, and learning with error correction.

Alternatively, or in combination, an ANN may be trained using an unsupervised method where the exact outputs resulted from a given set of inputs are not known before the completion of training. The ANN can be trained to classify an item into a plurality of categories, or data points into clusters. Multiple training algorithms can be employed for a sophisticated machine learning/training paradigm.

In one embodiment, a system contains two ANNs (e.g., ANN 105 and ANN 121). ANN 121 runs on monitored processing devices (e.g., monitored processing devices 117, 127, etc.). ANN 105 can be used to monitor the performance of ANN 121. ANN 105 can be trained to dynamically determine a new distribution of neurons (e.g., neurons 123, 131, etc.) for processing data within ANN 121.

In one example, neurons may be configured as an ANN or a convolutional neural network (CNN) that is trained using reinforcement learning. For example, ANN 105 may distribute neurons across processing devices (e.g., monitored processing device 117, 127, etc. within ANN 121) and monitor operating status (e.g., operating status 119, 129, etc.) of the monitored processing devices. Operating status may include, for example, an extent of resource utilization by the monitored processing devices, data flow to the monitored processing devices, or data flow from the monitored processing devices, etc. ANN 105 may then provide a new distribution of neurons to the monitored processing devices and compare the new operating status of the monitored processing devices with the previous operating status of the monitored processing devices. With each iteration of new distributions of neurons, ANN 105 learns to minimize the "cost" of the distribution of neurons such that processing for ANN 121 is accomplished with minimal resource utilization.

In one embodiment, ANN 121 takes data as input and processes the data using neurons (e.g., neurons 123, 131, etc.). In one embodiment, each set of neurons runs on a separate monitored processing device 117, 127, etc. and does a portion of the processing for ANN 121. In one example, ANN 121 may be used to monitor assembly lines in a factory. Neurons 123 may be used, for example, to process video images monitoring assembly line output, while neurons 131 may be used to process assembly line speed and vibration data, etc.

Each monitored processing device 117, 127, etc. may be, for example, a microprocessor, graphics processor, embedded processor, embedded controller, central processing unit (CPU), system on a chip (SOC), application specific integrated circuit (ASIC), field programmable gate array (FPGA), neural network accelerator, or other processing device. Monitored processing devices 117, 127, etc. may include a mix of processing devices. For example, monitored processing devices 117, 127, etc. may be used in small embedded controllers, laptops with multi-core microprocessors, and servers with large multi-core, multi-processor configurations.

In one embodiment, input to ANN 121 comes from data (e.g., data 147, data 151) from sensing devices (e.g., sensing device 145) and other data sources (e.g., data source 149). Sensing device 145 may include, for example, camera, microphone, motion sensor, vibration sensor, proximity sensor, GPS, accelerometer, RADAR, LIDAR, or other type of sensor. Data source 149 may include, for example, computing device, data storage device, device connected to a network (e.g., local area network (LAN), wide area network (WAN), internet, Bluetooth, etc.), or other type of data source. In one example, a factory may use data 147 from cameras, vibration sensors, and microphones as well as data 151 from databases with inventory and machine service records as input to ANN 121, where ANN 121 monitors machine health and production line output and predicts potential obstructions to production flow.

Each monitored processing device 117, 127, etc. tracks its respective operating status 119, 129, etc. and sends its operating status 119, 129, etc. to computing device 101. Operating status 119, 129, etc. may include, for example, available resources of the monitored processing device 117, 127, etc., an extent of resource utilization by the monitored processing device 117, 127, etc., data flow to the monitored processing device 117, 127, etc., or data flow from the monitored processing device 117, 127, etc. For example, monitored processing device 117 may be a small single-core embedded processor operating at a frequency of 1 MHz. Monitored processing device 117 may, for example, have a data flow of 500 KB/s into monitored processing device 117, a data flow of 50 KB/s out of monitored processing device 117, and may be operating at 75% of its processing capacity. Monitored processing device 117 may send this information as its operating status 119 to computing device 101.

Computing device 101 receives operating status 119, 129, etc. from monitored processing device 117, 127, etc. as data 113. ANN 105 uses input, such as data 113, predicted activity of neurons 123, 131, etc., data flow 143 between monitored processing devices 117, 127, etc., and may determine a new distribution for neurons 123, 131, etc. for ANN 121. For example, ANN 105 may predict that moving some neurons 123 from monitored processing device 117 into neurons 131 of monitored processing device 127 will reduce data flow 143 between monitored processing device 117 and monitored processing device 127 associated with either performing processing for neurons 123, 131, etc. in ANN 121 or configuring neurons 123, 131, etc. in ANN 121.

ANN 105 provides output 115 to monitored processing device 117, 127, etc. to communicate a new distribution of neurons 123, 131, etc. for ANN 121. For example, output 115 may be in the form of configuration file 125, 133, etc. Configuration file 125, 133, etc. may identify, for example, neuron connections and neuron weights for neurons 123, 131, etc. within each monitored processing device 117, 127, etc. within ANN 121 for which neurons are being added, removed or reconfigured.

In one embodiment, one or more updated configuration files are sent by an AI gateway to one or more processing nodes based on a determined distribution.

Processing device 103 may be instructed by instructions 111 to add a new monitored processing device (e.g., monitored processing device 135) to ANN 121. ANN 105 provides output 115 to communicate a new distribution of neurons 139 to monitored processing device 135. The new distribution of neurons may add new neurons 139 to ANN 121, may change the distribution of neurons 123, 131, 139, etc. within monitored processing device 117, 127, 135, etc., or may both add new neurons to ANN 121 and change the distribution of neurons within ANN 121.

In one example, monitored processing device 135 neurons 139 may enable new functionality within ANN 121 (e.g., monitoring a newly added assembly line) and the existing monitored processing device 117, 127, etc. neurons 123, 131, etc. may remain unchanged.

In one example, monitored processing device 135 neurons 139 may add new computing resources to ANN 121 (e.g., adding a new server) without adding new functionality to ANN 121. A new distribution of neurons 123, 131, 139, etc. may be determined that redistributes the neurons 123, 131, etc. from existing monitored processing device 117, 127, etc. to the new configuration of monitored processing devices 117, 127, 135, etc.

In one example, monitored processing device 135 neurons 139 may enable new functionality within ANN 121 (e.g., monitoring a newly added assembly line) and a new distribution of the existing monitored processing device 117, 127, etc. neurons 123, 131, etc. may be determined (e.g., new monitored processing device 135 may have extra processing capacity that can offload some processing from monitored processing device 117, 127, etc.). Output 115 may communicate the new distribution of neurons 123, 131, 139, etc. within each monitored processing device 117, 127, 135, etc. within ANN 121 for which neurons are being added, removed or reconfigured.

Figure 2:
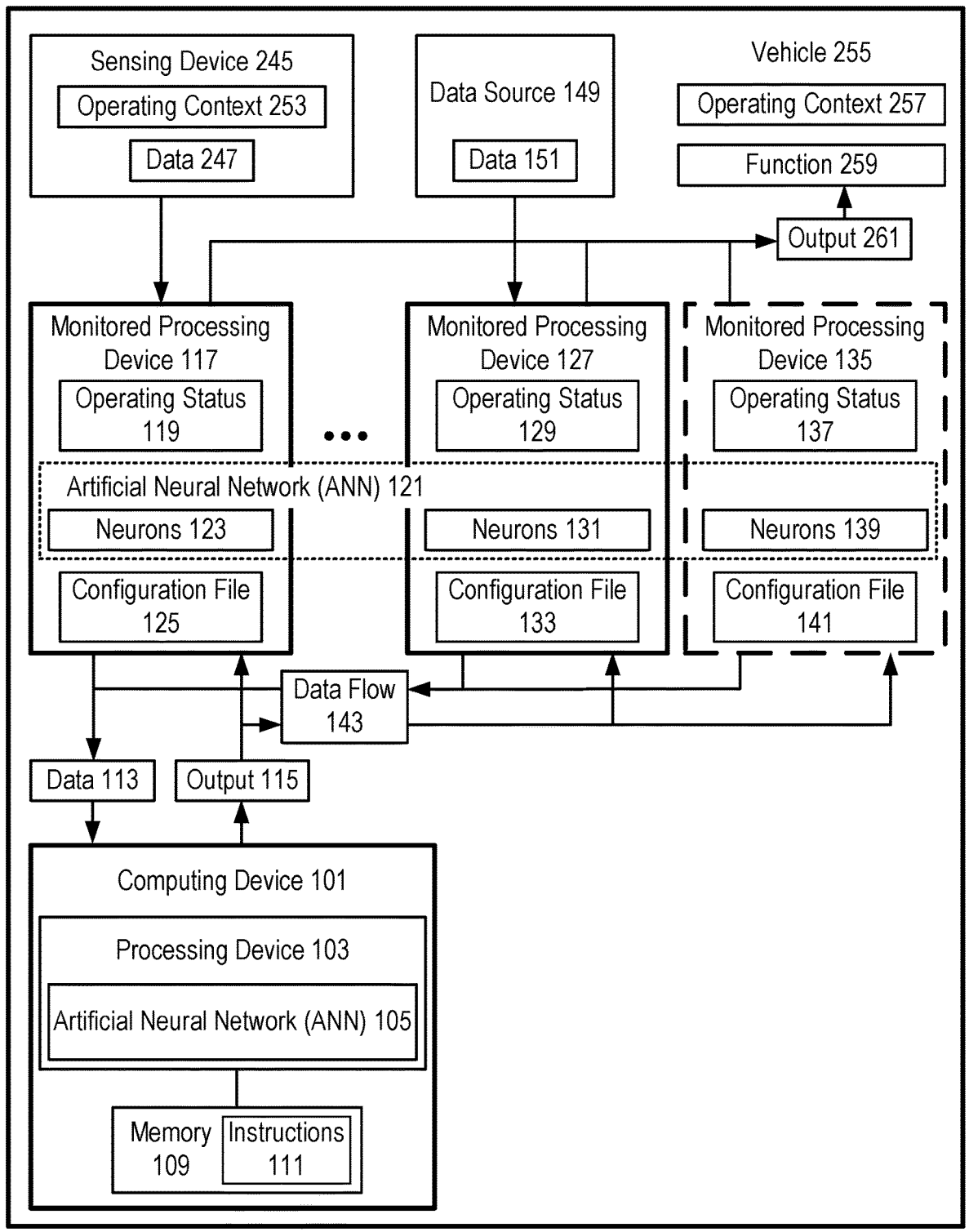
FIG. 2 illustrates a vehicle with a computing device that monitors processing devices configured to perform processing for neurons in an ANN and determines a new distribution for neurons in the ANN, in accordance with some embodiments.

FIG. 2 illustrates a vehicle with a computing device that monitors processing devices configured to perform processing for neurons in an ANN and determines a new distribution for neurons in the ANN, in accordance with some embodiments. The vehicle (e.g., vehicle 255) may be, for example, an autonomous vehicle, an electric vehicle, a gasoline or diesel-powered vehicle, or other vehicle. In some embodiments, the computing device (e.g., computing device 101), ANN (e.g., ANN 121), and monitored processing device (e.g., monitored processing device 117, 127, 135, etc.) are similar to computing device 101, ANN 121, and monitored processing device 117, 127, 135, etc. as described for FIG. 1. In one embodiment, monitored processing devices 117, 127, 135, etc. are all located within vehicle 255. In one embodiment, one or more monitored processing device 117, 127, 135, etc. is located within vehicle 255, and one or more monitored processing device 117, 127, 135, etc. is located outside vehicle 255. For example, a monitored processing device may be included in an edge computing device or cloud computing device supporting vehicle 255.

Input to ANN 121 may be provided by one or more sensing devices (e.g., sensing device 245) and/or data source (e.g., data source 149). In one embodiment, sensing device 245 and data source 149 are similar to sensing device 145 and data source 149 as described for FIG. 1. In one embodiment, sensing device 245 may be, for example, an image sensor, LIDAR, RADAR, GPS, accelerometer, motion sensor, proximity sensor, microphone, or other type of sensor. Sensing device 245 outputs collected sensor data 247 (e.g., images, video, GPS location, etc.) to monitored processing device 117, 127, 135, etc. For example, data 247 may be video, RADAR and LIDAR images sent to ANN 121 for navigation of vehicle 255.

In one embodiment, ANN 121 neurons 123, 131, 139, etc. within the monitored processing devices 117, 127, 135, etc. process data 247, 151 from sensing device 245 and/or data source 149 and provide output (e.g., output 261). Output 261 may be used to control one or more functions (e.g., function 259) (e.g., functions may include braking, navigation, engine control, etc.) of vehicle 255. In one example, sensing device 245 is a camera within vehicle 255 and data 247 contains video images from the camera. ANN 121 may, for example, process data 247 from sensing device 245 and identify an object (e.g., another vehicle, a pedestrian, a bicycle, etc.) in the path of vehicle 255. Output 261 may control one or more function 259 (e.g., braking, steering, etc.) of vehicle 255.

In one embodiment, sensing device 245 operates within an operating context (e.g., operating context 253) of sensing device 245. Operating context 253 is the environment in which sensing device 245 is operating. For example, a camera may be operating in daylight, night time, clear weather, rain, etc. conditions. ANN 105 may determine a new distribution of neurons 123, 131, 139 etc. within ANN 121 corresponding to a change in operating context 253 of sensing device 245. For example, operating context 253 for sensing devices 245 may change from clear weather to heavy fog. ANN 105 may determine a new distribution of neurons 123, 131, 139, etc. for ANN 121 to add computational resources for processing RADAR data and LIDAR data and reduce computational resources for processing camera data in response to the change in operating context 253 of sensing device 245.

In one embodiment, vehicle 255 operates within an operating context (e.g., operating context 257) of the vehicle. Operating context 257 is the environment in which vehicle 255 is operating. For example, vehicle 255 may be operating in a rural environment with little traffic, an urban environment with heavy traffic, an area with many external processing resources available (e.g., edge computing devices, cloud servers, etc.), few external processing resources available, clear weather, inclement weather, day time, night time, various features of vehicle 255 enabled or disabled, etc. ANN 105 may determine a new distribution of neurons 123, 131, 135, etc. within ANN 121 corresponding to a change in operating context 257 of vehicle 255.

In one example, operating context 257 of vehicle 255 may change from light traffic with cruise-control engaged to heavy traffic with cruise-control turned off. ANN 105 may determine a new distribution of neurons 123, 131, 139, etc. for ANN 121, for example, to add computational resources for processing camera data, RADAR data and LIDAR data and reduce computational resources supporting cruise-control and other features not being used.

In one embodiment, ANN 105 may determine a new distribution of neurons 123, 131, 139, etc. based on proximity of monitored processing devices 117, 127, 135, etc. to data source 149. In one example, data source 149 may be a computing device located within vehicle 255 and monitored processing device 127 may be located in a first cloud computing device located outside vehicle 255. As vehicle 255 travels, a second cloud computing device may become closer (e.g., within 5 kilometers or less, or within 500 meters or less) to vehicle 255 than the first cloud computing device. ANN 105 may add a monitored processing device (e.g., monitored processing device 135) located within the second cloud computing device to ANN 121 and determine a new distribution of neurons 123, 131, 139, etc. based on the proximity of monitored processing device 135 to data source 149. In other examples, proximity may be based on network characteristics such as number of hops, communication delay, jitter, etc.

Figure 3:
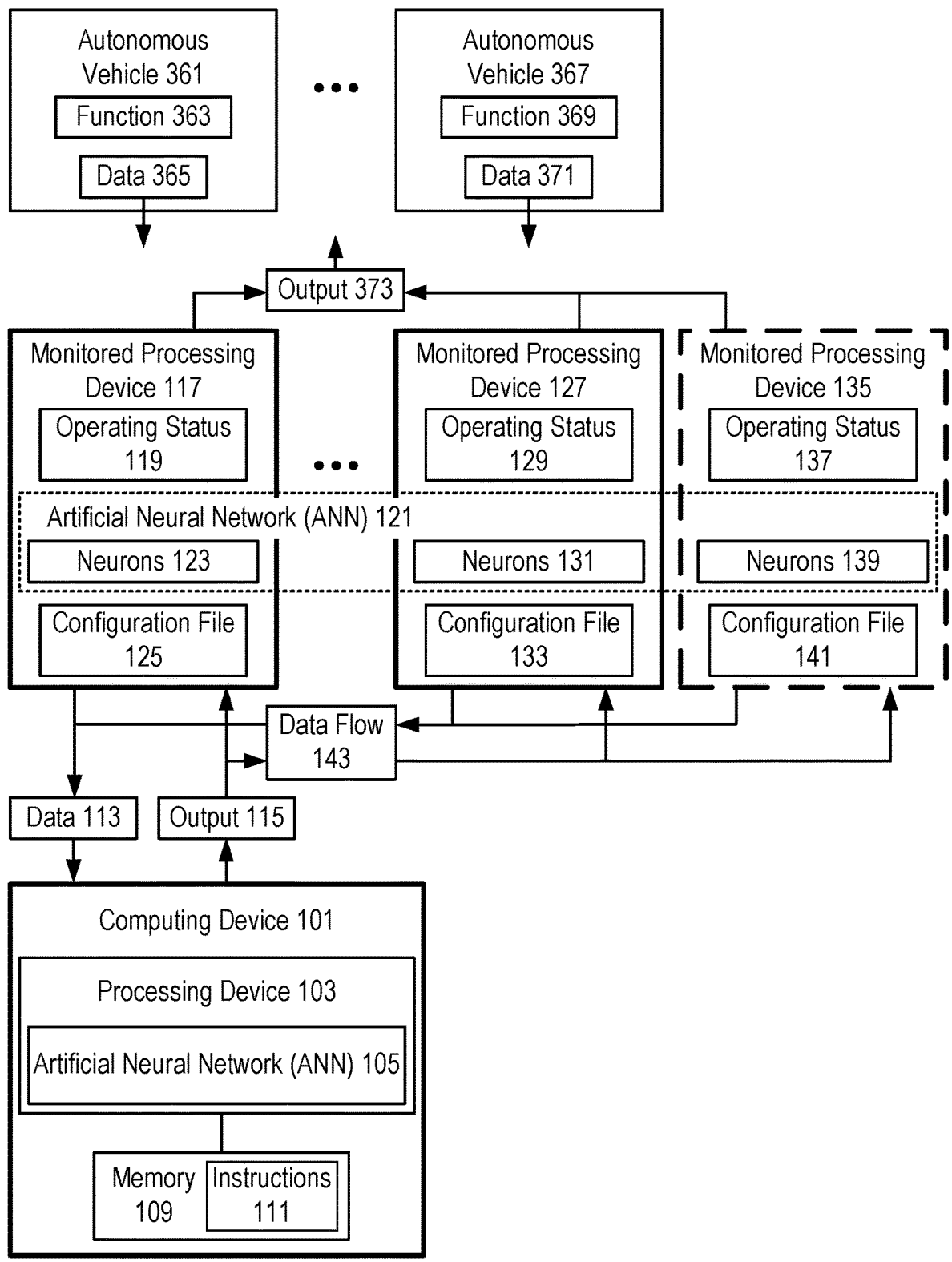
FIG. 3 illustrates a system including one or more autonomous vehicles and a computing device that monitors processing devices configured to perform processing for neurons in an ANN, and determines a new distribution for neurons in the ANN, in accordance with some embodiments.

FIG. 3 illustrates one or more autonomous vehicles and a computing device that monitors processing devices configured to perform processing for neurons in an ANN, and determines a new distribution for neurons in the ANN, in accordance with some embodiments. In one embodiment, one or more autonomous vehicles (e.g., autonomous vehicle 361, 367, etc.) provide data (e.g., data 365, 371, etc.) to an ANN (e.g., ANN 121) and receive output (e.g., output 373) from ANN 121. In one embodiment, ANN 121 runs on monitored processing devices (e.g., monitored processing device 117, 127, 135, etc.) and the one or more monitored processing devices 117, 127, 135, etc. are part of a network of cloud computing devices supporting autonomous vehicle 361, 367, etc. Autonomous vehicle 361, 367, etc. may be, for example, an electric vehicle, a gasoline or diesel-powered vehicle, a hybrid vehicle, or other type of vehicle.

In one embodiment, data 365, 371, etc. from autonomous vehicle 361, 367, etc. is provided as input to ANN 121. Data 365, 371, etc. may include, for example, GPS location of autonomous vehicle 361, 367, etc., status of autonomous vehicle 361, 367, etc., data from sensing devices of autonomous vehicle 361, 367, etc., or other type of data. In one example, data 365, 371, etc. includes video images sent from autonomous vehicle 361, 367, etc. to ANN 121 for processing or analysis.

In one embodiment, ANN 121 processes data 365, 371, etc. from autonomous vehicle 361, 367, etc. and provides output 373. Output 373 may be used to control one or more function (e.g., function 363, 369, etc.) of autonomous vehicle 361, 367, etc. In one example, ANN 121 receives LIDAR images as data 365, 371, etc. from autonomous vehicle 361, 367, etc. Output 373 may include, for example, identification of objects in the LIDAR images. Autonomous vehicle 361, 367, etc. may use output 373 to control functions 363, 369, etc., such as steering or braking, in response to receiving output 373.

In one example, ANN 121 receives a GPS location of autonomous vehicle 361, 367, etc. as data 365, 371, etc. from autonomous vehicle 361, 367, etc. Output 373 may include, for example, identification of congested roads near autonomous vehicle 361, 367, etc. Autonomous vehicle 361, 367, etc. may use output 373 to control functions 363,369, etc., such as vehicle navigation, in response to receiving output 373.

Figure 4:
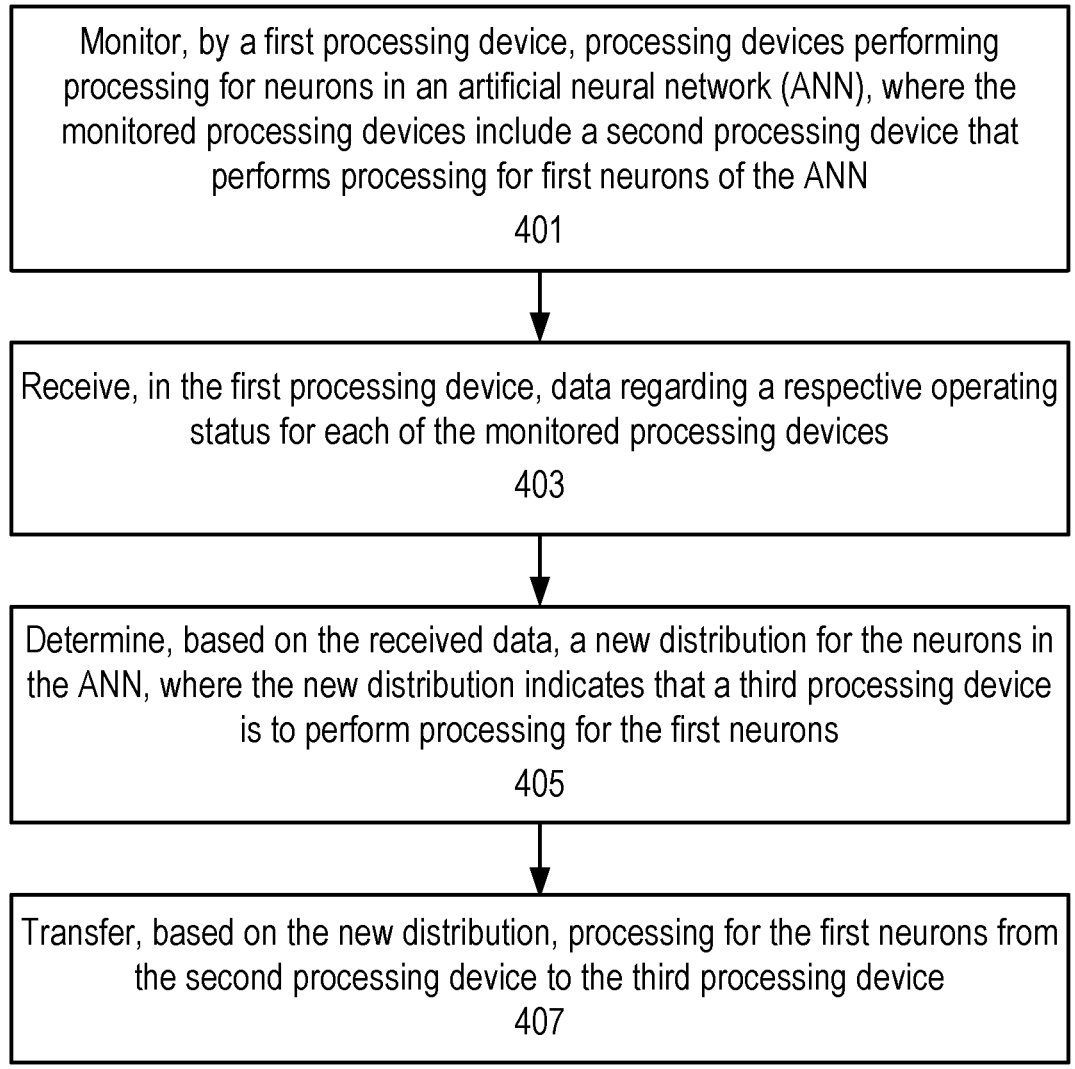
FIG. 4 shows a method for monitoring processing devices configured to perform processing for neurons in an ANN and determining a new distribution for the neurons in the ANN, in accordance with some embodiments.

FIG. 4 shows a method for monitoring processing devices configured to perform processing for neurons in an ANN and determining a new distribution for the neurons in the ANN, in accordance with some embodiments. For example, the method of FIG. 4 can be implemented in the system of FIG. 1. In one example, the monitored processing devices are monitored processing device 117, 127, 135, etc. In one example, the neurons are neurons 123, 131, 139, etc. within ANN 121.

The method of FIG. 4 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 4 is performed at least in part by one or more processing devices (e.g., processing device 103 of FIG. 1).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 401, processing devices performing processing for neurons in an artificial neural network are monitored. In one example, ANN 121 includes neurons 123, 131, 139, etc. that are running on monitored processing devices 117, 127, 135, etc. In one example, monitored processing devices 117, 127, 135, etc. are monitored by processing device 103.

At block 403, data is received regarding a respective operating status of each of the monitored processing devices. In one example, data 113 is received by processing device 103 from monitored processing devices 117, 127, 135, etc. In one example, data 113 is operating status 119, 129, 137, etc. of monitored processing devices 117, 127, 135, etc.

At block 405, a determination is made for a new distribution of neurons based on the received data. In one example, ANN 105 determines a new distribution of neurons 123, 131, 139, etc. for ANN 121. In one example, monitored processing device 135 is a newly added monitored processing device, and a new distribution of neurons 123, 131, 139, etc. is determined to add the new monitored processing device to ANN 121.

At block 407, neurons are transferred from a second processing device to a third processing device. In one example, a new distribution of neurons 123, 131, etc. from monitored processing devices 117, 127, etc. are distributed across neurons 123, 131, 139, etc. of monitored processing device 117, 127, 135, etc. In one example, the neurons are transferred by output 115 from ANN 105. In one example, output 115 contains updated configuration files 125, 133, 141, etc. for monitored processing devices 117, 127, 135, etc. In one example, neurons are transferred from processing device 117 to processing device 103, 127, and/or 135.

Figure 5:
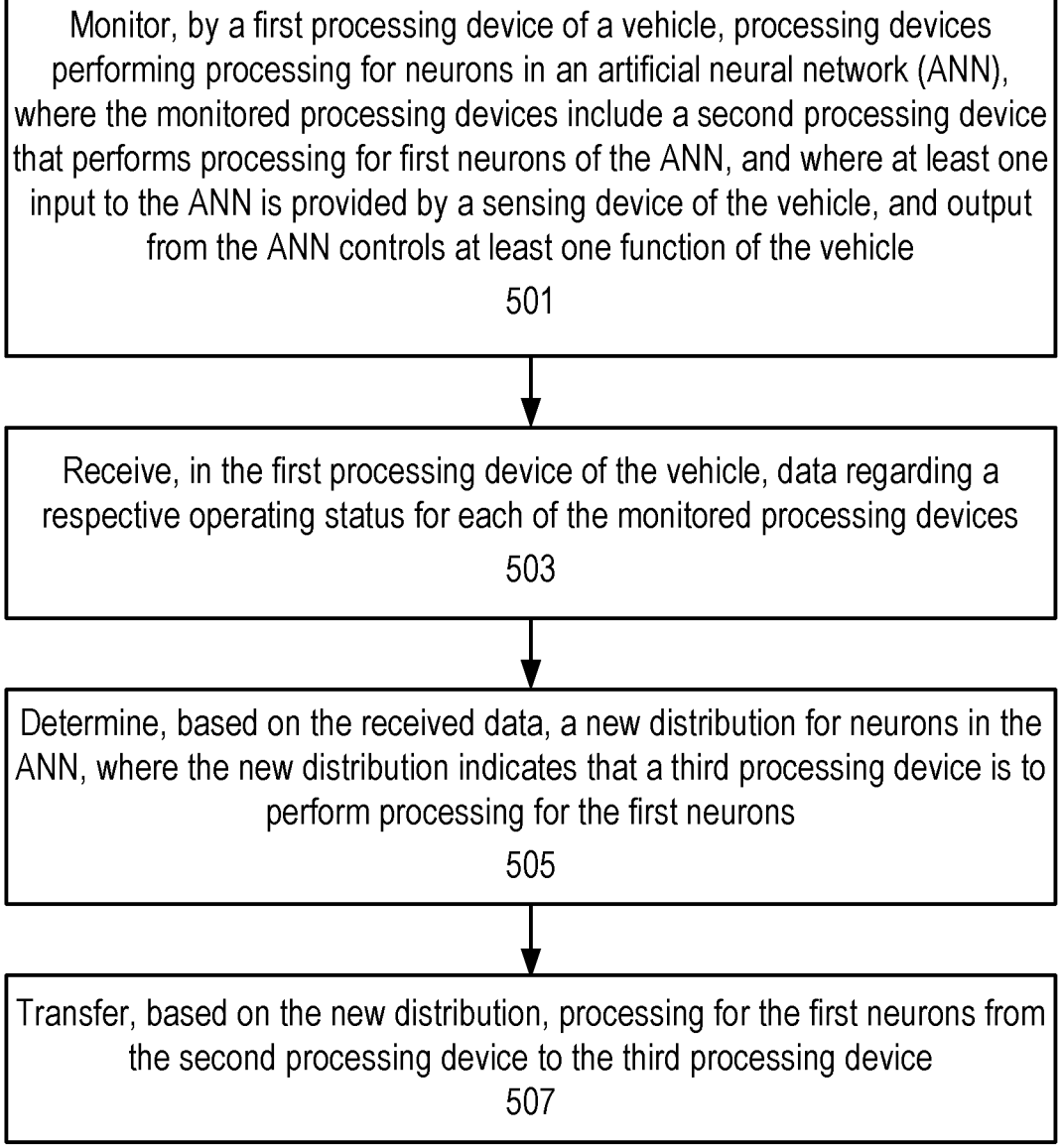
FIG. 5 shows a method for monitoring processing devices configured to perform processing for neurons in an ANN of a vehicle and determining a new distribution for the neurons in the ANN, in accordance with some embodiments.

FIG. 5 shows a method for monitoring processing devices configured to perform processing for neurons in an ANN of a vehicle and determining a new distribution for the neurons in the ANN, in accordance with some embodiments. For example, the method of FIG. 5 can be implemented in the system of FIG. 2. In one example, the vehicle is vehicle 255. In one example, monitored processing devices 117, 127, 135, etc. are monitored by processing device 103 of vehicle 255. In one example, the neurons are neurons 123, 131, 139, etc. within ANN 121.

The method of FIG. 5 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 5 is performed at least in part by one or more processing devices (e.g., processing device 103 of FIG. 2).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 501, processing devices performing processing for neurons in an artificial neural network of a vehicle are monitored. One or more inputs to the ANN are provided by sensing device(s). Output from the ANN controls at least one function of the vehicle. In one example, input to ANN 121 is provided, in part, by data 247 from sensing device 245. In one example, output from ANN 121 is output 261. In one example, output 261 controls one or more function (e.g., function 259) of vehicle 255. In one example, function 259 is a steering or braking function of vehicle 255.

At block 503, data is received regarding a respective operating status of each of the monitored processing devices of the vehicle. In one example, the vehicle is vehicle 255. In one example, data 113 is operating status 119, 129, 137, etc. (e.g., processing device resource utilization, data flow to/from processing device, etc.) of monitored processing devices 117, 127, 135, etc.

At block 505, a determination is made for a new distribution of neurons based on the received data. In one example, ANN 105 determines a new distribution of neurons 123, 131, 139, etc. for ANN 121 based on a change in operating context 257 of vehicle 255.

At block 507, neurons are transferred from a second processing device to a third processing device. In one example, a new distribution of neurons 123, 131, 139, etc. is distributed across monitored processing devices 117, 127, 135, etc. In one example, the neurons are transferred by output 115 from ANN 105. In one example, output 115 identifies neuron connections and neuron weights for neurons 123, 131, 139, etc.

Figure 6:
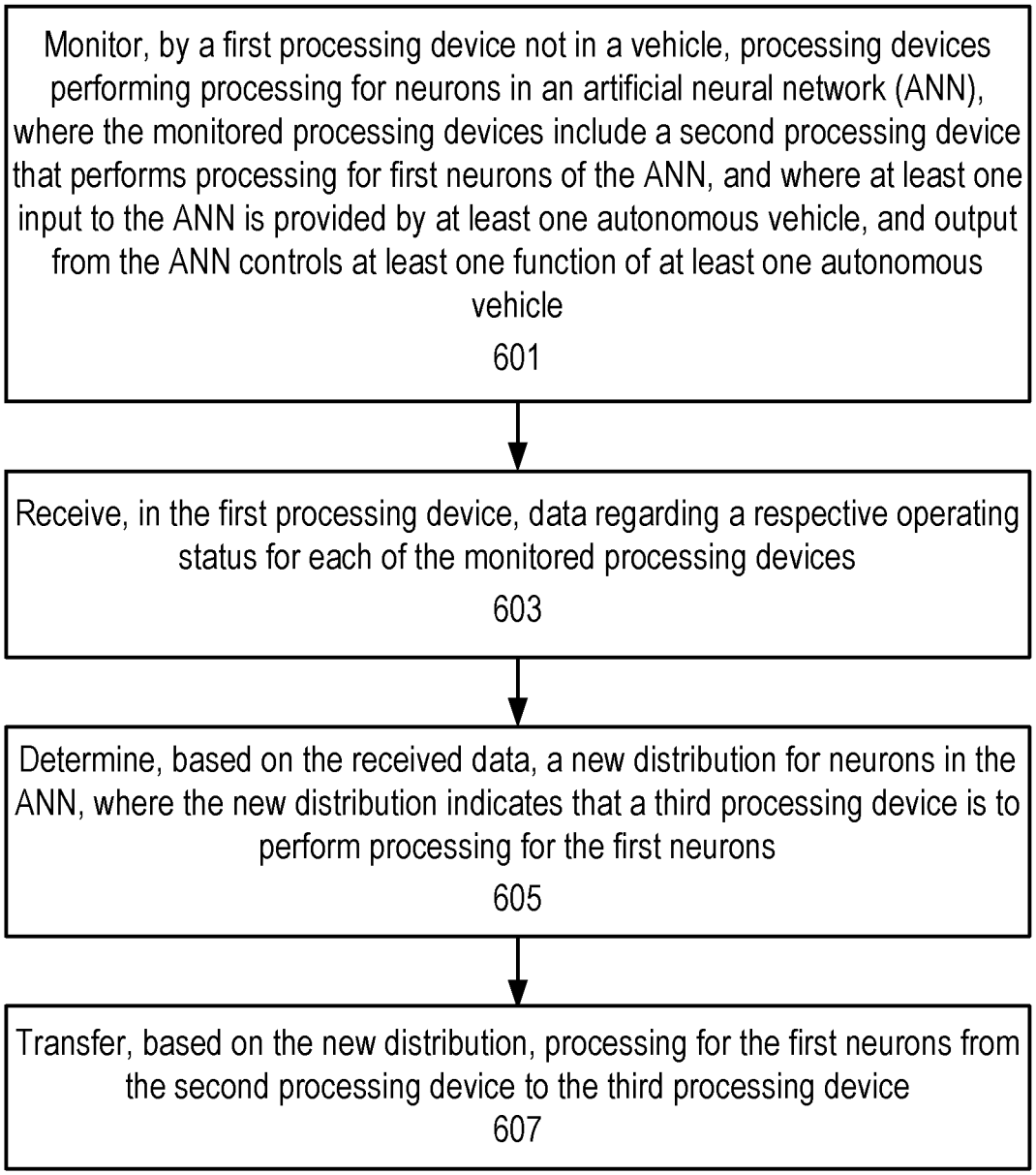
FIG. 6 shows a method for monitoring processing devices configured to perform processing for neurons in an ANN supporting one or more autonomous vehicles and determining a new distribution for neurons in the ANN, in accordance with some embodiments.

FIG. 6 shows a method for monitoring processing devices configured to perform processing for neurons in an ANN supporting one or more autonomous vehicles and determining a new distribution for neurons in the ANN, in accordance with some embodiments. A processing device that is separate from (not located in) a vehicle monitors the monitored processing devices. At least one input to the ANN is provided by at least one autonomous vehicle. Output from the ANN controls at least one function of at least one autonomous vehicle. For example, the method of FIG. 6 can be implemented in the system of FIG. 3. In one example, the at least one autonomous vehicle is autonomous vehicle 361, 367, etc. In one example, processing device 103 and computing device 101 are part of a network of cloud servers. In one example, output from the ANN is output 373 (e.g., navigation control) from ANN 121.

The method of FIG. 6 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 6 is performed at least in part by one or more processing devices (e.g., processing device 103 of FIG. 3).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 601, processing devices performing processing for neurons in an artificial neural network supporting one or more autonomous vehicles are monitored. At least one input to the ANN is provided by at least one autonomous vehicle. Output from the ANN controls at least one function of the one or more vehicles. In one example, the at least one autonomous vehicle is autonomous vehicle 361, 367, etc. In one example, at least one input to ANN 121 is provided by data 365, 371, etc. from autonomous vehicle 361, 367, etc. In one example, output from ANN 121 is output 373. In one example, output 373 controls one or more functions (e.g., function 363, 369, etc.) of autonomous vehicle 361, 367, etc. In one example, function 363, 369, etc. is vehicle navigation for autonomous vehicle 361, 367, etc.

At block 603, data is received regarding a respective operating status of each of the monitored processing devices supporting one or more autonomous vehicle(s). In one example, data 113 is operating status 119, 129, 137, etc. of monitored processing devices 117, 127, 135, etc. (e.g., data flow between monitored processing device 117, 127, 135, etc. and autonomous vehicle 361, 367, etc.).

At block 605, a determination is made for a new distribution of neurons based on the received data. In one example, ANN 105 determines a new distribution of neurons 123, 131, 139, etc. for ANN 121 based on proximity of autonomous vehicle 361, 367, etc. to monitored processing device 117, 127, 135, etc.

At block 607, neurons are transferred from a second processing device to a third processing device. In one example, a new distribution of neurons 123, 131, 139, etc. is distributed across monitored processing devices 117, 127, 135, etc. In one example, the neurons are transferred by output 115 from ANN 105.

In one embodiment, a system includes: at least one processing device (e.g., processing device 103); and at least one memory (e.g., memory 109) containing instructions (e.g., instructions 111) configured to instruct the at least one processing device to: receive data regarding a respective operating status (e.g., operating status 119, 129, 137, etc.) for each of monitored processing devices (e.g., monitored processing devices 117, 127, 135, etc.), wherein the monitored processing devices perform processing for neurons in an artificial neural network (ANN) (e.g., ANN 121), and wherein the monitored processing devices include a first processing device that performs processing for first neurons of the ANN; determine, based on the received data, a new distribution for the neurons in the ANN, wherein the new distribution indicates that a second processing device is to perform processing for the first neurons; and in response to determining the new distribution, send a communication to the second processing device to transfer processing for the first neurons from the first processing device to the second processing device.

In one embodiment, the ANN is used to process data received from at least one sensing device (e.g., sensing device 245).

In one embodiment, the new distribution corresponds to a change in an operating context (e.g., operating context 253) of the at least one sensing device.

In one embodiment, a vehicle (e.g., vehicle 255) includes the at least one sensing device (e.g., a camera) and the second processing device, and wherein the second processing device controls at least one function of the vehicle (e.g., acceleration or steering).

In one embodiment, the ANN is a first ANN; the received data is input to a second ANN (e.g., ANN 105); processing for the second ANN is performed by the at least one processing device; and the determining the new distribution includes predicting the new distribution based on output (e.g., output 115) from the second ANN.

In one embodiment, the sent communication includes at least one of neuron connections or neuron weights for the first neurons.

In one embodiment, the instructions are further configured to instruct the at least one processing device to send a communication to the first processing device regarding the transfer of processing for the first neurons from the first processing device to the second processing device.

In one embodiment, the instructions are further configured to instruct the at least one processing device to: add a new processing device (e.g., monitored processing device 135) to perform processing for the ANN; and in response to determining the new distribution, send a communication to the new processing device to transfer processing for second neurons of the ANN to the new processing device.

In one embodiment, at least one data source (e.g., data source 149) provides data used as input to the ANN, and wherein the new distribution is determined based on a proximity of the monitored processing devices to the at least one data source.

In one embodiment, the at least one processing device includes at least one of a neural network accelerator, a field programmable gate array (FPGA), a central processing unit (CPU), or a graphics processing unit (GPU).

In one embodiment, a method includes: monitoring, by a first processing device, processing devices performing processing for neurons (e.g., neurons 123, 131, 139, etc.) in an artificial neural network (ANN), wherein the monitored processing devices include a second processing device that performs processing for first neurons of the ANN; receiving data regarding a respective operating status for each of the monitored processing devices; determining, based on the received data, a new distribution for the neurons in the ANN, wherein the new distribution indicates that a third processing device is to perform processing for the first neurons; and transferring, based on the new distribution, processing for the first neurons from the second processing device to the third processing device.

In one embodiment, the new distribution includes at least one of neuron connections or neuron weights for the first neurons.

In one embodiment, transferring processing includes: updating a configuration file to include the at least one of neuron connections or neuron weights; and sending the updated configuration file to the first processing device and the second processing device.

In one embodiment, each respective operating status includes at least one of available resources of the monitored processing device, an extent of resource utilization by the monitored processing device, a data flow to the monitored processing device, or a data flow from the monitored processing device.

In one embodiment, the ANN is a first ANN; the received data (e.g., data 113) is input to a second ANN; and the method further includes determining the new distribution for the neurons in the first ANN is based on output from the second ANN.

In one embodiment, output from the ANN is used to control a vehicle (e.g., an autonomous vehicle), and the new distribution corresponds to a change in an operating context of the vehicle (e.g., operating context 257).

In one embodiment, the change in the operating context is at least one of a change in lighting conditions in which the vehicle is operating, a change in weather conditions in which the vehicle is operating, a change in a configuration of functions performed by the vehicle, or a change in a number of processing devices available to perform processing for the neurons in the ANN.

In one embodiment, at least one non-transitory computer-readable medium stores instructions which, when executed on at least one computing device, cause the at least one computing device to at least: monitor processing devices performing processing for neurons in an artificial neural network (ANN), wherein the monitored processing devices include a first processing device that performs processing for first neurons of the ANN; determine, based on monitoring the processing devices, a new distribution for the ANN; and transfer, based on the new distribution, processing for the first neurons from the first processing device to a second processing device.

In one embodiment, the new distribution is determined based on at least one predicted data flow between the monitored processing devices associated with at least one of configuring the ANN based on the new distribution, or performing processing for the neurons in the ANN based on the new distribution.

In one embodiment, determining the new distribution is based on predicted activity of at least one neuron in the ANN.

In some embodiments, processing of data (e.g., sensor or other data) using one or more ANNs and monitored processing devices as described above is implemented using a cloud system (e.g., a server in the cloud monitors the processing devices). In one example, a computing environment operates in conjunction with embodiments of the present disclosure. The components of the computing environment may be implemented using various combinations of hardware and software components.

The exemplary computing environment may include a client computing device, a provider server (e.g., an AI gateway that monitors devices performing ANN computations), an authentication server, and/or a cloud component, which communicate with each other over a network.

The client computing device may be any computing device such as desktop computers, laptop computers, tablets, PDAs, smart phones, mobile phones, smart appliances, wearable devices, IoT devices, in-vehicle devices, and so on. According to various embodiments, the client computing device accesses services at the provider server.

The client computing device (e.g., an edge device in a vehicle) may include one or more input devices or interfaces for a user of the client computing device. For example, the one or more input devices or interfaces may include one or more of: a keyboard, a mouse, a trackpad, a trackball, a stylus, a touch screen, a hardware button of the client computing device, and the like. The client computing device may be configured to execute various applications (e.g., a web browser application) to access the network.

The provider server may be an AI gateway and/or any computing device configured to host one or more applications/services. In some embodiments, the provider server may require security verifications before granting access to the services and/or resources provided thereon. In some embodiments, the applications/services may include online services that may be engaged once a device (e.g., a contoller of vehicle 361 or 367) has authenticated its access. In some embodiments, the provider server may be configured with an authentication server for authenticating users and/or devices.

In other embodiments, an authentication server may be configured remotely and/or independently from the provider server.

The network may be any type of network configured to provide communication between components of the cloud system. For example, the network may be any type of network (including infrastructure) that provides communications, exchanges information, and/or facilitates the exchange of information, such as the Internet, a Local Area Network, Wide Area Network, Personal Area Network, cellular network, near field communication (NFC), optical code scanner, or other suitable connection(s) that enables the sending and receiving of information between the components of the cloud system. In other embodiments, one or more components of the cloud system may communicate directly through a dedicated communication link(s).

In various embodiments, the cloud system may also include one or more cloud components. The cloud components may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.). In some embodiments, either one or both of the provider server and the authentication server may be configured to operate in or with cloud computing/architecture such as: infrastructure a service (IaaS), platform as a service (PaaS), and/or software as a service (SaaS).

The disclosure includes various devices which perform the methods and implement the systems described above, including data processing systems which perform these methods, and computer-readable media containing instructions which when executed on data processing systems cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In this description, various functions and/or operations may be described as being performed by or caused by software code to simplify description. However, those skilled in the art will recognize what is meant by such expressions is that the functions and/or operations result from execution of the code by one or more processing devices, such as a microprocessor, Application-Specific Integrated Circuit (ASIC), graphics processor, and/or a Field-Programmable Gate Array (FPGA). Alternatively, or in combination, the functions and operations can be implemented using special purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of computer-readable medium used to actually effect the distribution.

At least some aspects disclosed can be embodied, at least in part, in software. That is, the techniques may be carried out in a computing device or other system in response to its processing device, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions (sometimes referred to as computer programs). Invocation interfaces to these routines can be exposed to a software development community as an API (Application Programming Interface). The computer programs typically include one or more instructions set at various times in various memory and storage devices in a computer, and that, when read and executed by one or more processors in a computer, cause the computer to perform operations necessary to execute elements involving the various aspects.

A computer-readable medium can be used to store software and data which when executed by a computing device causes the device to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a computer-readable medium in entirety at a particular instance of time.

Examples of computer-readable media include, but are not limited to, recordable and non-recordable type media such as volatile and non-volatile memory devices, read only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions. Other examples of computer-readable media include, but are not limited to, non-volatile embedded devices using NOR flash or NAND flash architectures. Media used in these architectures may include un-managed NAND devices and/or managed NAND devices, including, for example, eMMC, SD, CF, UFS, and SSD.

In general, a non-transitory computer-readable medium includes any mechanism that provides (e.g., stores) information in a form accessible by a computing device (e.g., a computer, mobile device, network device, personal digital assistant, manufacturing tool having a controller, any device with a set of one or more processors, etc.).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (IoT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or other computing device that includes a memory and a processing device. The host system can include or be coupled to a memory sub-system so that the host system can read data from or write data to the memory sub-system. The host system can be coupled to the memory sub-system via a physical host interface. In general, the host system can access multiple memory sub-systems via a same communication connection, multiple separate communication connections, and/or a combination of communication connections.

In some embodiments, the computing device is a system including one or more processing devices. Examples of the processing device can include a microcontroller, a central processing unit (CPU), special purpose logic circuitry (e.g., a field programmable gate array (FPGA), an application specific integrated circuit (ASIC), etc.), a system on a chip (SoC), or another suitable processor.

In one example, a computing device is a controller of a memory system. The controller includes a processing device and memory containing instructions executed by the processing device to control various operations of the memory system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system comprising:
    an image sensor of a vehicle;
    at least one of a LIDAR sensor or RADAR sensor of the vehicle;
    at least one processing device; and
    at least one memory containing instructions configured to instruct the at least one processing device to:
        determine a change in operating context of at least one of the image sensor, LIDAR sensor, or RADAR sensor;
        receive data regarding a respective real-time operating status for each of monitored processing devices, wherein the monitored processing devices perform processing for neurons in an artificial neural network (ANN), wherein the monitored processing devices include a first processing device that performs processing for first neurons of the ANN, wherein the ANN is used for navigation of the vehicle by identifying objects using data from at least one of the image sensor, LIDAR sensor, or RADAR sensor, and wherein the ANN uses data received from the image sensor and at least one of the LIDAR sensor or RADAR sensor as input to the ANN;
        in response to the change in operating context of the image sensor, LIDAR sensor, or RADAR sensor, determine, based on the received data, a new distribution for the neurons in the ANN to add resources for processing data from at least one of the LIDAR sensor or RADAR sensor, and to reduce resources for processing data from the image sensor, wherein the new distribution indicates that a second processing device is to perform processing for the first neurons; and
        in response to determining the new distribution, send a communication to the second processing device to transfer processing for the first neurons from the first processing device to the second processing device, wherein an output from processing the first neurons on the second processing device controls at least one function of the vehicle.

2. The system of claim 1, wherein the image sensor is a camera.

3. The system of claim 1, wherein:
    the ANN is a first ANN;
    the received data is input to a second ANN;
    processing for the second ANN is performed by the at least one processing device; and
    the determining the new distribution comprises predicting the new distribution based on output from the second ANN.

4. The system of claim 1, wherein the sent communication comprises at least one of neuron connections or neuron weights for the first neurons.

5. The system of claim 1, wherein the instructions are further configured to instruct the at least one processing device to send a communication to the first processing device regarding the transfer of processing for the first neurons from the first processing device to the second processing device.

6. The system of claim 1, wherein the instructions are further configured to instruct the at least one processing device to:
    add a new processing device to perform processing for the ANN; and
    in response to determining the new distribution, send a communication to the new processing device to transfer processing for second neurons of the ANN to the new processing device.

7. The system of claim 1, wherein at least one data source provides data used as input to the ANN, and wherein the new distribution is determined based on a proximity of the monitored processing devices to the at least one data source.

8. The system of claim 1, wherein the at least one processing device comprises at least one of a neural network accelerator, a field programmable gate array (FPGA), a central processing unit (CPU), or a graphics processing unit (GPU).

9. A method comprising:
    determining a change in operating context of at least one of an image sensor, a LIDAR sensor, or a RADAR sensor;
    monitoring, by a first processing device in real-time, processing devices performing processing for neurons in an artificial neural network (ANN), wherein the monitored processing devices include a second processing device that performs processing for first neurons of the ANN, and wherein the ANN is used for navigation of a vehicle;
    receiving data regarding a respective operating status for each of the monitored processing devices, wherein each respective operating status comprises at least one of a data flow to the monitored processing device, or a data flow from the monitored processing device;
    in response to the change in operating context of the image sensor, LIDAR sensor, or RADAR sensor, determining, based on the received data, a new distribution for the neurons in the ANN to add resources for processing data from at least one of the LIDAR sensor or RADAR sensor, and to reduce resources for processing data from the image sensor, wherein the new distribution indicates that a third processing device is to perform processing for the first neurons; and
    transferring, based on the new distribution, processing for the first neurons from the second processing device to the third processing device, wherein output from processing the first neurons by the ANN on the third processing device is used to control the vehicle.

10. The method of claim 9, wherein the new distribution comprises at least one of neuron connections or neuron weights for the first neurons.

11. The method of claim 10, wherein the transferring processing comprises:
    updating a configuration file to include the at least one of neuron connections or neuron weights; and
    sending the updated configuration file to the first processing device and the second processing device.

12. The method of claim 9, wherein each respective operating status further comprises at least one of available resources of the monitored processing device, or an extent of resource utilization by the monitored processing device.

13. The method of claim 9, wherein:
    the ANN is a first ANN;
    the received data is input to a second ANN; and
    the determining the new distribution for the neurons in the first ANN is further based on output from the second ANN.

14. The method of claim 9, wherein the new distribution further corresponds to a change in an operating context of the vehicle.

15. The method of claim 14, wherein the change in the operating context of the vehicle is at least one of a change in lighting conditions in which the vehicle is operating, a change in weather conditions in which the vehicle is operating, a change in a configuration of functions performed by the vehicle, or a change in a number of processing devices available to perform processing for the neurons in the ANN.

16. At least one non-transitory computer-readable medium storing instructions which, when executed on at least one computing device, cause the at least one computing device to at least:

determine a change in operating context of at least one of an image sensor, a LIDAR sensor, or a RADAR sensor;

monitor, in real-time, processing devices performing processing for neurons in an artificial neural network (ANN), wherein the monitored processing devices include a first processing device that performs processing for first neurons of the ANN, and wherein the ANN is used for navigation of a vehicle;

in response to the change in operating context of the image sensor, LIDAR sensor, or RADAR sensor, determine, based on monitoring the processing devices, a new distribution for the ANN to add resources for processing data from at least one of the LIDAR sensor or RADAR sensor, and to reduce resources for processing data from the image sensor, wherein the new distribution is further based on at least one of an actual data flow to each monitored processing device, or an actual data flow from each monitored processing device; and transfer, based on the new distribution, processing for the first neurons from the first processing device to a second processing device, wherein an output from processing the first neurons on the second processing device controls at least one function of the vehicle.

17. The non-transitory computer-readable medium of claim 16, wherein the new distribution is determined further based on at least one predicted data flow between the monitored processing devices associated with at least one of configuring the ANN based on the new distribution, or performing processing for the neurons in the ANN based on the new distribution.

18. The non-transitory computer-readable medium of claim 16, wherein the determining the new distribution is further based on predicted activity of at least one neuron in the ANN.

* * * * *